R. SCHMITZ.
VALVE FOR GAS ENGINES.
APPLICATION FILED MAR. 6, 1911.
1,183,773.
Patented May 16, 1916.
4 SHEETS—SHEET 1.
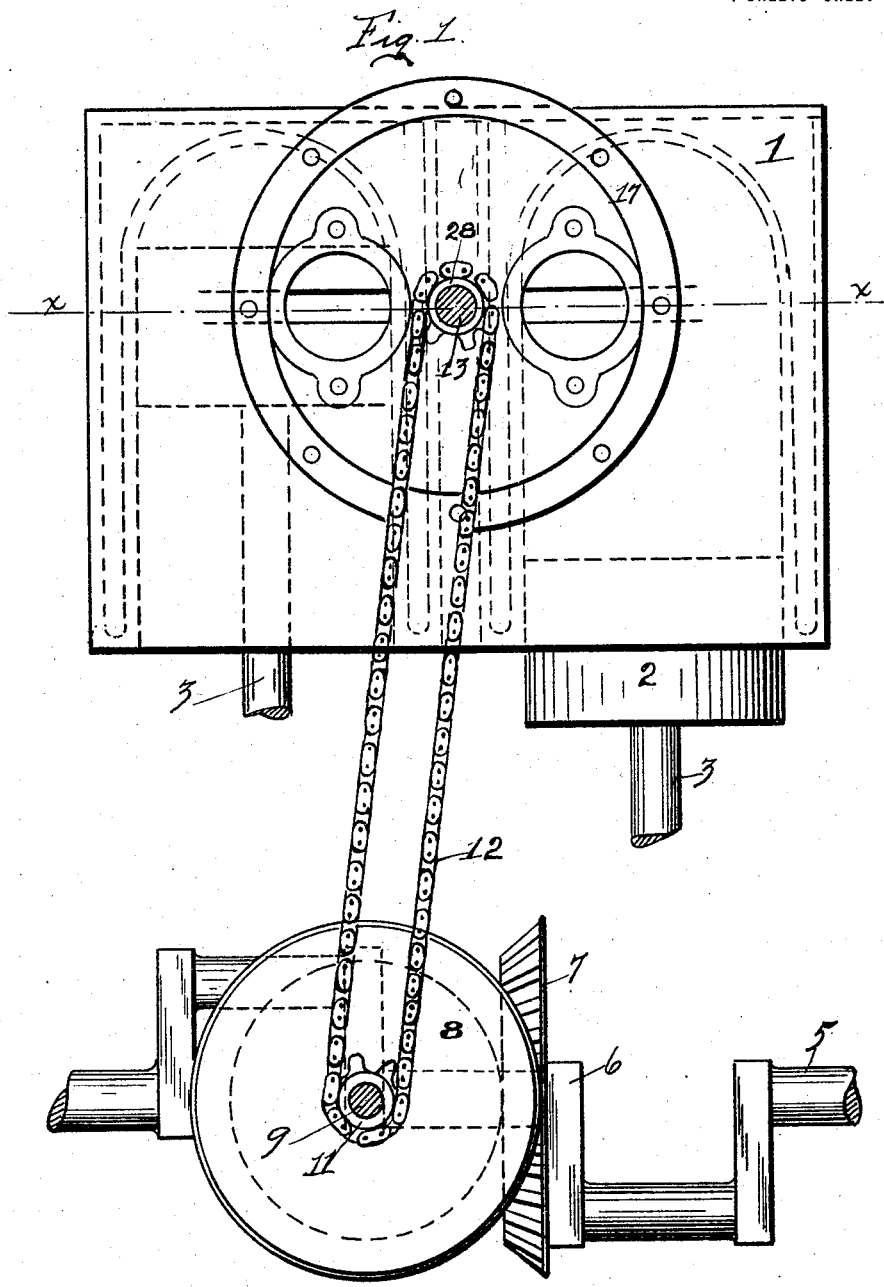

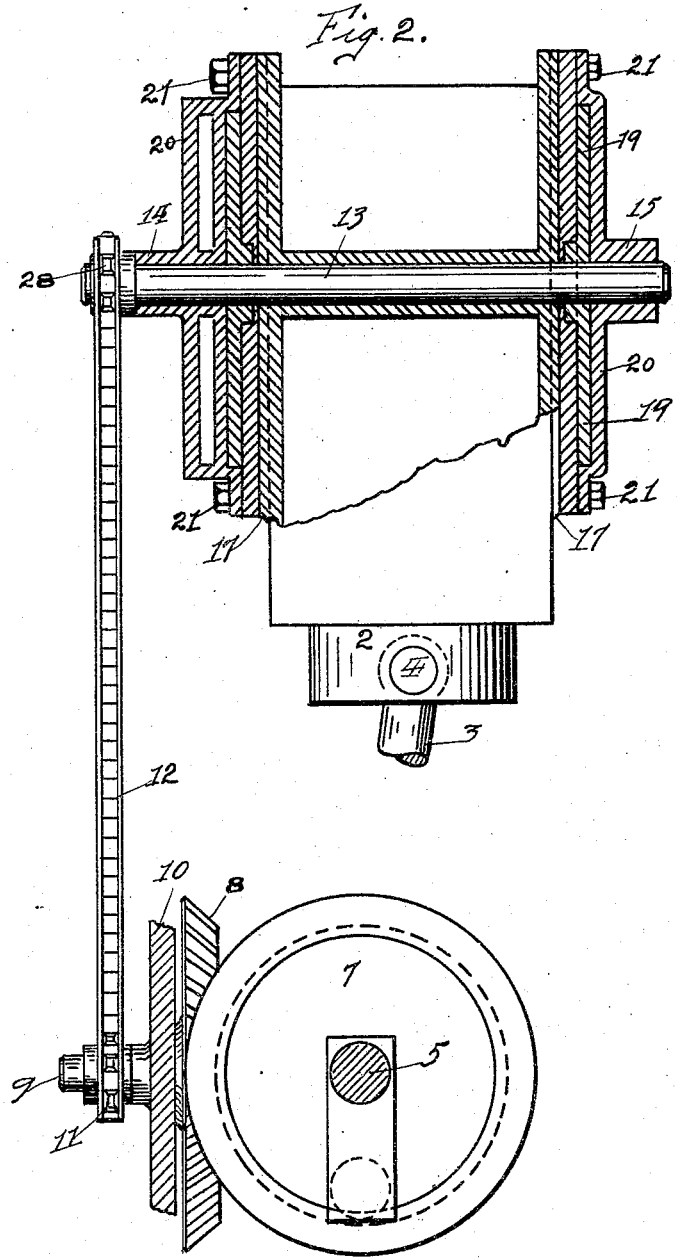

R. SCHMITZ.
VALVE FOR GAS ENGINES.
APPLICATION FILED MAR. 6, 1911.
1,183,773.
Patented May 16, 1916.
4 SHEETS—SHEET 3.
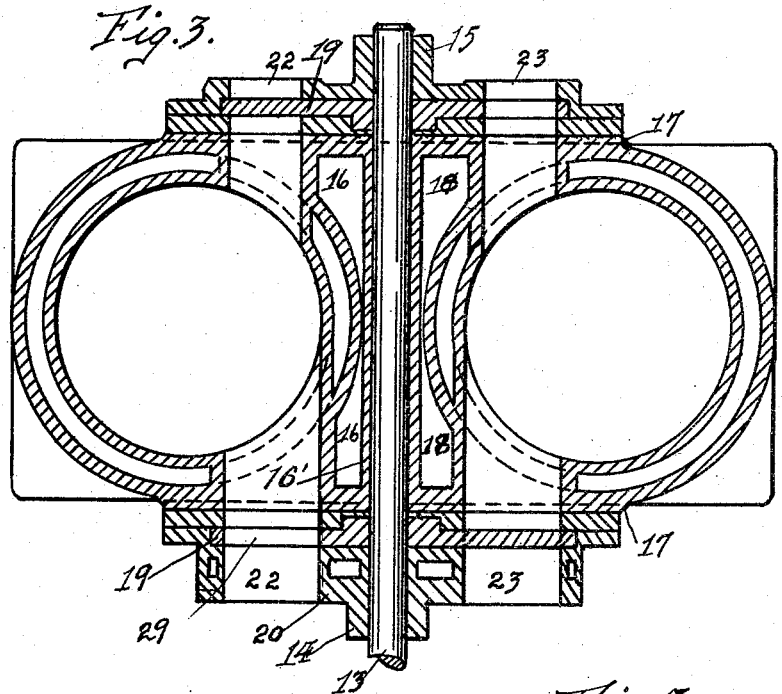
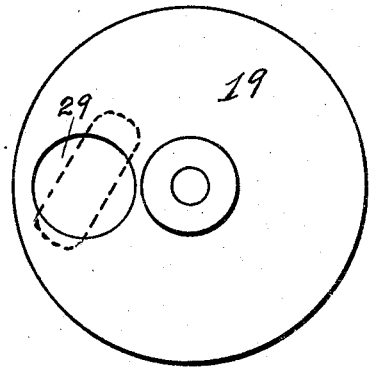
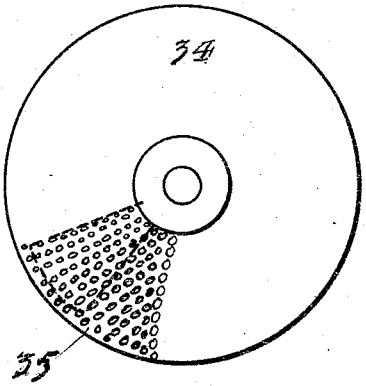
WITNESSES:
INVENTOR
Richard Schmitz
BY
Harry Lea Dodson
ATTORNEY R. SCHMITZ.
VALVE FOR GAS ENGINES.
APPLICATION FILED MAR. 6, 1911.
1,183,773.
Patented May 16, 1916.
4 SHEETS—SHEET 4.
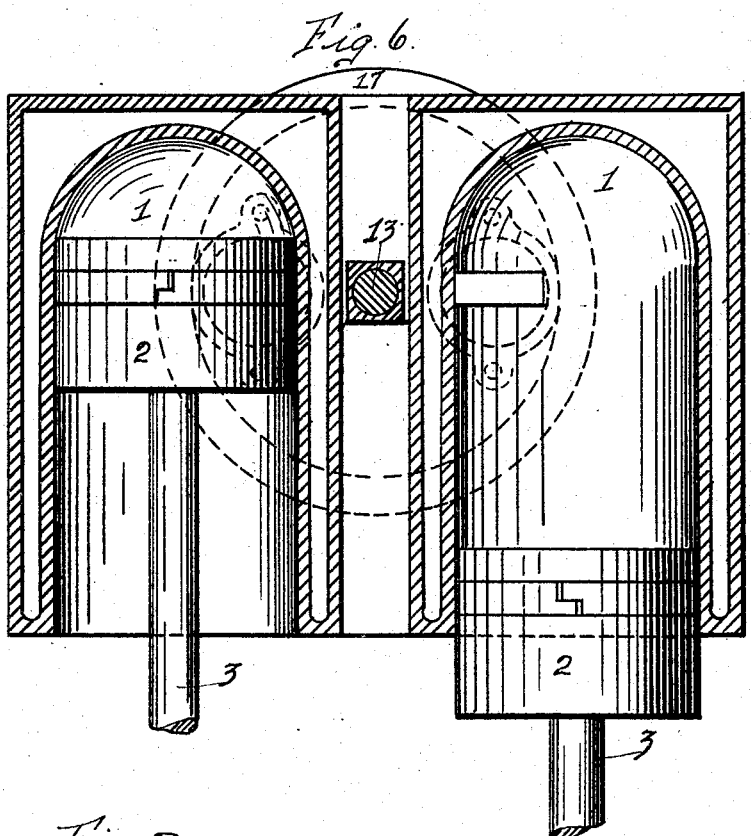
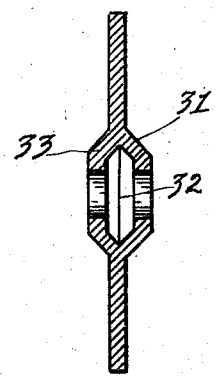
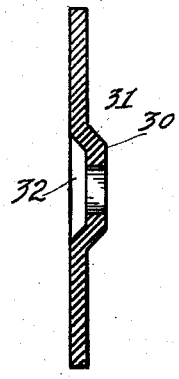
WITNESSES
INVENTOR
Richard Schmitz
By Harry Lea Dodson
Attorney

UNITED STATES PATENT OFFICE.

RICHARD SCHMITZ, OF CHICAGO, ILLINOIS, ASSIGNOR TO SCHMITZ ENGINE COMPANY, A CORPORATION OF SOUTH DAKOTA.

VALVE FOR GAS-ENGINES.

1,183,773.  Specification of Letters Patent.  Patented May 16, 1916.

Application filed March 6, 1911. Serial No. 612,512.

*To all whom it may concern:*

Be it known that I, RICHARD SCHMITZ, a citizen of the United States, residing in Chicago, county of Cook, and State of Illinois, have invented a certain new and useful Improvement in Valves for Gas-Engines, of which the following is a specification.

My invention relates to that class of engines in which the valve is rotated instead of elevated by cams or other similar devices, and has for its object to greatly simplify the construction of an engine.

My means of accomplishing the foregoing object may be more readily understood by having reference to the accompanying drawings, which are hereunto annexed and are a part of this specification, in which:

Figure 1 is a side elevation of an engine utilizing my improved valve. Fig. 2 is an end view partly in section. Fig. 3 is a cross section on the line $x$ $x$ in Fig. 1. Fig. 4 is a detail, showing the valve proper. Fig. 5 is a detailed view, showing a modified form of the valve. Fig. 6 is a vertical, sectional view, showing the interior of the cylinders, and the location of the valve shaft. Figs. 7 and 8 show modified forms of valves being shown in cross section.

Similar reference numerals refer to similar parts throughout the entire description.

As shown in the drawings, 1 indicates the cylinders, having pistons 2 operating therein.

3 is a connecting rod pivotally attached to a piston by means of the piston pin 4, the connecting rod extending to a crank 5. This part of the rod has been omitted, as it *per se* forms no part of my present invention, and for the reason that any of the usual devices for this purpose may be used. On the crank 5 adjacent the arm 6 thereof, I mount a bevel gear 7, which must be of sufficient diameter, so that the arm of the crank will clear the inner edge of the teeth of the said gear. This gear is in mesh with a gear 8, which is fixedly mounted upon a shaft 9, which is suitably secured in a side wall 10, of the crank case, a fragmentary portion of the latter only being shown. The outer end of this shaft 9 has a sprocket 11, mounted thereon, which carries a chain 12 which extends to a sprocket 28, which is mounted on and rigidly secured to the end of the valve shaft 13. This shaft is mounted and rotates in journal bearings 14 and 15, and extends between the cylinders from one side to the other. Considerable difficulty has been experienced in the operation of rotary valves due to the inability to cool the valve shaft. I avoid this objection by providing a number of large spaces 16 and 18 formed by the sleeve 16′ which are open to the air and, which it will be observed completely separate the shaft bearing from contact with the cylinder walls except at their outer ends, and these walls are directly in contact with the water in the water-jacket, so that they will not be subjected to undue heating.

A lug or shoulder 17 is cast or formed on the side walls of the cylinders, and a port or passage extends from the face of the said lug to the interior of the said cylinder. A similar lug is formed on the opposite wall of the cylinders and is also provided with ports or passages for the inlet of the explosive charge. Upon the shaft 13 adjacent the face of the lug 17 is mounted my improved valve 19, which is as clearly seen in the detailed views, a disk, which is formed with a boss or hub on its central portion. In some cases it may be found desirable to construct the valve disks in the forms shown in Figs. 7 and 8. In Fig. 7 I provide a raised portion 30, which joins the main disk by a bevel wall 31, and this form provides for an air space 32, and, as will be apparent, both strengthens and helps to cool the valve. In Fig. 8 the structure is the same as Fig. 7 only that I provide an additional raised portion 33 on the opposite side of the valve. The valve 19 is provided with an opening 29, which is adapted to register with the ports or passages extending from the face of the lug to the interior of the cylinder. It will be obvious to the persons skilled in the art that the shape of the openings 29 may be varied to suit conditions, as to whether one desired to accomplish extra quick opening or closing or other variations without deviating from the scope of my invention. Outside of the valve 19 I place a pressure plate 20, which is secured to the lug 17 by bolts 21 or in any other convenient manner. The plates are provided with a bearing for the valve shaft 13 and are provided with openings 22, and 23, which correspond to the ports or passages extending to the interior of the cylinders. A similar form of construction is utilized from the other side of the cylinder except the area of the ports vary. I have shown the plate 20 on the exhaust side water-jacketed for the purpose of cooling the exhaust valve. I do not believe that under ordinary circumstances it will be necessary to water-jacket the inlet valve. When necessary it can, of course, be done without departing from the spirit of my invention. For the purpose of illustration I have shown a concrete form of rotating the valve shaft 13, and in turn the valves proper, but I do not wish to be understood as limiting myself to the precise form shown, as many mechanical devices may be used to accomplish the result. For example, a shaft and beveled gears or a train of gears might be employed, and in fact a number of devices, all of which would be capable of effecting rotation of the valve in the desired direction.

In Fig. 5 I have illustrated a modified form of valve, which is designed to effect a regulation of the speed of the engine in a more efficient manner than simply throttling by the movement of the valve. In this form, a portion of a plate 34, which corresponds in diameter to the valve 19 is provided with a plurality of minute perforations 35, which increase in size from the point at which they commence to the portion of the plate where they terminate. A plate 28 is mounted on the plate 34 and so constructed that the same may move on the plate 34 and cover a pre-determined number of perforations, to regulate the gas flowing to the engine. Practice has shown that the utilization of a plate of this character permits the regulation of the speed of a gas engine with great nicety, and without so great a loss in efficiency as where the usual throttling means are employed.

It may be found desirable in some cases to simply recess a piece of foraminated metal into the valve disk itself, covering the opening instead of having the separate plate 28.

The operation of the device is as follows: The rotation of the crank 5 carries with it the bevel gear 7, and it, in turn, causes the bevel gear 8 to rotate, thus causing the rotation of the shaft 9, which carries with it the sprocket 11, and thus through the medium of the chain 12, the valve shaft 13 is rotated. The rotation of this shaft brings the opening in the inlet valve in register with the port or passage, leading the incoming charge to the interior of the cylinders, the opening in the exhaust valve being so located with reference to the opening in inlet valve so as to cause it to come into register with the exhaust port or passage after the charge has entered the cylinder and been fired.

Having described my invention, what I regard as new and desire to secure by Letters Patent is:—

1. In a gas engine having a plurality of cylinders, a transverse shaft passing between the cylinders adjacent the explosion chamber, there being inlet and exhaust ports on the opposite sides of said cylinders, a disk valve secured to each end of said shaft, which disks have openings therethrough corresponding in size to the inlet and exhaust ports, each disk adapted to control the ports of the two cylinders and means to cause said openings to register with the said ports at a predetermined time.

2. In a gas engine having a plurality of cylinders a transverse shaft passing between the cylinders adjacent the explosion chamber, there being inlet and exhaust ports on opposite sides of the cylinders, disk valves fixedly secured to said shaft, having openings therein adapted to register with the ports in the cylinders, pressure plates adapted to hold the valves to their seats and means actuated by the crank shaft to rotate said shaft.

3. In a gas engine having a plurality of cylinders, a transverse shaft passing between the cylinders adjacent the explosion chamber, there being inlet and exhaust ports on the opposite sides of said cylinders, a disk valve secured to each end of said shaft, which disks have openings therethrough corresponding in size to the inlet and exhaust ports, each disk being adapted to control the ports of two cylinders, means to cause said openings to register with the said ports at a predetermined time and pressure plates adapted to hold the valves to their seats.

4. In a gas engine having a plurality of cylinders, a transverse shaft passing between the cylinders adjacent the explosion chamber, there being inlet and exhaust ports on the opposite sides of said cylinders, a disk valve secured to each end of said shaft, which disks have openings therethrough corresponding in size to the inlet and exhaust ports, each disk being adapted to control the ports of two cylinders, means to cause said openings to register with the said ports at a predetermined time, pressure plates adapted to hold the valves to their seats and means to cool said disks.

5. In a gas engine having a plurality of vertical cylinders, there being inlet and exhaust ports on opposite sides of the cylinders, of a shaft mounted intermediate two cylinders adjacent the explosion chamber, disk valves fixedly attached to said shaft having openings therein adapted to register with the ports in the cylinders, a sprocket mounted on the said shaft, a chain on the said sprocket, a bevel gear on the crank shaft of the engine, a bevel gear meshing with the said gear, a shaft rotating with said latter gear and a sprocket fixedly secured to said shaft on which said chain runs.

6. In a gas engine having a plurality of vertical cylinders, lugs formed on two sides of the cylinders adjacent the explosion chamber, there being exhaust and inlet ports formed in the said lugs, rotary disk valves having openings therein adapted to register with the ports, pressure plates to hold said valves in position and means actuated by the crank shaft to rotate said valves.

7. In a gas engine having a plurality of vertical cylinders, lugs formed on two sides of the cylinders, adjacent the explosion chamber, there being exhaust and inlet ports formed in the said lugs, rotary disk valves having openings therein adapted to register with the ports, pressure plates to hold said valves in position, means actuated by the crank shaft to rotate said valves and means to cool said disk valves.

8. A rotary disk valve for gas engines comprising vertical cylinders having inlet and exhaust ports on opposite sides adjacent the explosion chamber, of a shaft located, intermediate the cylinders, adjacent said ports, a transverse shaft located intermediate the cylinders and shaft, a sleeve surrounding said shaft, there being a space on all sides of said sleeve open to the air, means actuated by the crank shaft to rotate said shaft, disk valves fixedly secured to said shaft having openings therethrough adapted to register with the exhaust and inlet ports.

9. A rotary disk valve for gas engines comprising vertical cylinders having inlet and exhaust ports on opposite sides adjacent the explosion chamber, of a shaft located intermediate the cylinders adjacent said ports, a transverse shaft located intermediate the cylinders and shaft, a sleeve surrounding said shaft, there being a space on all sides of said sleeve open to the air, means actuated by the crank shaft to rotate said shaft, disk valves fixedly secured to said shaft having openings therethrough adapted to register with the exhaust and inlet ports and pressure plates adapted to hold said valves to their seats.

10. A rotary valve for gas engines comprising cylinders having inlet and exhaust ports on opposite sides adjacent the explosion chambers, a sleeve supported between the cylinders, and in spaced relation therewith, to form a cooling chamber, a shaft supported in the sleeve, a disk valve having an opening, secured to each end of the shaft, and means for rotating said shaft whereby the openings in the valves are brought into registry with the respective inlet and exhaust ports.

11. A rotary disk valve for gas engines, comprising cylinders having inlet and exhaust ports on opposite sides thereof, a shaft supported between the cylinders, a cooling chamber surrounding the shaft, disks having an opening adapted to register with the respective ports of the cylinders, mounted on each end of the shaft, said disks adapted to control the ports of the cylinders and means for revolving said shaft.

In witness whereof I have signed the foregoing specification.

RICHARD SCHMITZ.

Witnesses:
 JOHN R. MARKLE,
 C. M. BAUMEISTER.

Copies of this patent may be obtained for five cents each, by addressing the "Commissioner of Patents, Washington, D. C."